United States Patent [19]
Shibahara et al.

[11] Patent Number: 5,726,727
[45] Date of Patent: Mar. 10, 1998

[54] LIQUID CRYSTAL DISPLAY DEVICE CAPABLE OF PRODUCING A DISPLAY OF HIGH VIGNETTING FACTOR AND EXCELLENT CONTRAST

[75] Inventors: Hideo Shibahara; Susumu Ohi; Muneo Maruyama; Michiaki Sakamoto, all of Tokyo, Japan

[73] Assignee: NEC Corporation, Tokyo, Japan

[21] Appl. No.: 625,189

[22] Filed: Apr. 1, 1996

[30] Foreign Application Priority Data

Mar. 30, 1995 [JP] Japan ................. 7-072811

[51] Int. Cl.$^6$ .................. G02F 1/1337; G02F 1/1343
[52] U.S. Cl. .................. 349/144; 349/129; 349/146
[58] Field of Search ............... 349/42, 129, 143, 349/144, 146

[56] References Cited

U.S. PATENT DOCUMENTS

| | | | |
|---|---|---|---|
| 4,728,172 | 3/1988 | Cannella | 349/144 |
| 4,861,143 | 8/1989 | Yamazaki et al. | 349/129 |
| 4,969,718 | 11/1990 | Noguchi et al. | 349/144 |
| 4,995,703 | 2/1991 | Noguchi | 349/144 |
| 5,317,437 | 5/1994 | Karakura | 349/144 |
| 5,416,619 | 5/1995 | Koike | 349/42 |
| 5,438,442 | 8/1995 | Katakura | 349/144 |
| 5,473,455 | 12/1995 | Koike et al. | 349/129 |

*Primary Examiner*—William L. Sikes
*Assistant Examiner*—Toan Ton
*Attorney, Agent, or Firm*—Sughrue, Mion, Zinn, Macpeak & Seas, PLLC

[57] ABSTRACT

In a liquid crystal display device including first and second substrate members, a layer of a liquid crystal material between the first and the second substrate members, an active switching element formed on the first substrate member, a pixel electrode connected to the active switching element and which has first and second portions, a primary signal line connected to the pixel electrode, a secondary signal line adjacent to the primary signal line with the pixel electrode interposed therebetween, a scanning line connected to the pixel electrode, the first portion of the pixel electrode is nearer to the primary signal line than to the secondary signal line while the second portion of the pixel electrode is nearer to the secondary signal line than to the primary signal line.

12 Claims, 8 Drawing Sheets

FIG. 8

LIQUID CRYSTAL DISPLAY DEVICE CAPABLE OF PRODUCING A DISPLAY OF HIGH VIGNETTING FACTOR AND EXCELLENT CONTRAST

BACKGROUND OF THE INVENTION

This invention relates to a liquid crystal display (LCD) device and, more particularly, to an active matrix liquid crystal display device.

Conventional liquid crystal display devices have a contrast angular dependence problem, i.e., the transmittance in each gray level depends on viewing angles. In particular, this contrast angular dependence is very strong in the up and down directions. This angular dependence in the up and down directions is caused by the electrically induced liquid crystal director configuration. The contrast angular dependence problem is particularly serious in twisted nematic liquid crystal display devices. In order to solve this angular dependence problem, a liquid crystal display device having a two-domain twisted nematic cell structure has been proposed. In this liquid crystal display device, each pixel has two director configuration domains, where the two pre-tilted directions are in opposing directions. The liquid crystal display device having the two-domain twisted nematic cell structure shows good opto-electric characteristics in a wide viewing angle range.

However, another problem caused by disclination arises in the conventional twisted nematic liquid crystal display device in which a liquid crystal display cell is divided into the two domains. Disclination refers to a region where liquid crystal orientations are discrete. When the twisted nematic liquid crystal display cell is supplied with voltage, some disclinations are generated in the twisted nematic liquid crystal display cells. Accordingly, leakage of light occurs due to the disclinations, when the conventional twisted nematic liquid crystal display device is made in "normally white" mode. The leakage of light brings about a deterioration of display contrast. In order to solve this problem, proposals have been made of various types of the conventional twisted nematic liquid crystal display devices. An example is disclosed in Japanese Unexamined Patent Publication H5-224210. In this example, shading films are provided either on a lower substrate or on an upper substrate in alignment with a division line of the above-mentioned two domains so as to prevent the leakage of light therefrom.

However, the disclination generated in line with the division line of the two domains gets linked to disclinations generated perpendicular to the disclination in the division line to produce disclination curves. As a result, leakage of light is also caused to occur where the disclination curves are produced. If shading films are fabricated to cover the disclination curves, a vignetting factor of the display panel is deteriorated.

SUMMARY OF THE INVENTION

It is an object of this invention to provide a liquid crystal display device in which the disclination curves are reduced.

It is another object of this invention to provide a liquid crystal display device which is capable of providing a display of high vignetting factor and excellent contrast.

According to an aspect of this invention, there is provided a liquid crystal display device comprising: first and second substrate members; a layer of a liquid crystal material which is positioned between the first and the second substrate members and which is divided into first and second layer domains adjacent to each other; the first layer domain having a first pre-tilt direction of liquid crystal orientations, the second layer domain having a second pre-tilt direction of liquid crystal orientations, the first pre-tilt direction being different from the second pre-tilt direction; a thin-film transistor which is formed on the first substrate member and which has a drain electrode, a gate electrode and a source electrode; a pixel electrode which is electrically connected to the source electrode and which has first and second portions with the first and the second portions being corresponding to the first and the second layer domains, respectively; a primary drain line electrically connected to the drain electrode to supply the pixel electrode with an image signal; a secondary drain line adjacent to the primary drain line with the pixel electrode interposed therebetween; a gate line which is electrically connected to the gate electrode and which is perpendicular to the primary and secondary drain lines; the first portion of the pixel electrode being remote from the primary drain line by a first distance while being remote from the secondary drain line by a second distance larger than the first distance; and the second portion of said pixel electrode being remote from the secondary drain line by a primary distance while being remote from the primary drain line by a secondary distance larger than the primary distance.

According to another aspect of this invention, there is also provided a liquid crystal display device comprising: first and second substrate members; a layer of a liquid crystal material which is positioned between the first and the second substrate members and which is divided into first and second layer domains adjacent to each other; the first layer domain having a first pre-tilt direction of liquid crystal orientations, the second layer domain having a second pre-tilt direction of liquid crystal orientations, the first pre-tilt direction being different from the second pre-tilt direction; a thin-film transistor which is formed on the first substrate member and which has a drain electrode, a gate electrode and a source electrode; a pixel electrode which is electrically connected to the source electrode and which has first and second portions with the first and the second portions corresponding to the first and the second layer domains, respectively; a primary drain line electrically connected to the drain electrode to supply the pixel electrode with an image signal; a secondary drain line adjacent to the primary drain line with the pixel electrode interposed therebetween; a gate line which is electrically connected to the gate electrode and which is perpendicular to the primary and secondary drain lines; the first portion of the pixel electrode being remote from the secondary drain line by a first distance while being remote from the primary drain line by a second distance larger than the first distance; and the second portion of the pixel electrode being remote from the primary drain line by a primary distance while being remote from the secondary drain line by a secondary distance larger than the primary distance.

DESCRIPTION OF THE PREFERRED EMBODIMENTS

FIGS. 1 through 5(A) to 5(D) will first be referred to for description of a conventional liquid crystal display device and problems involved therein. This is in order to facilitate an understanding of the present invention. The liquid crystal display device is equivalent to the conventional liquid crystal display device described in the preamble of the instant specification.

Figure 1:
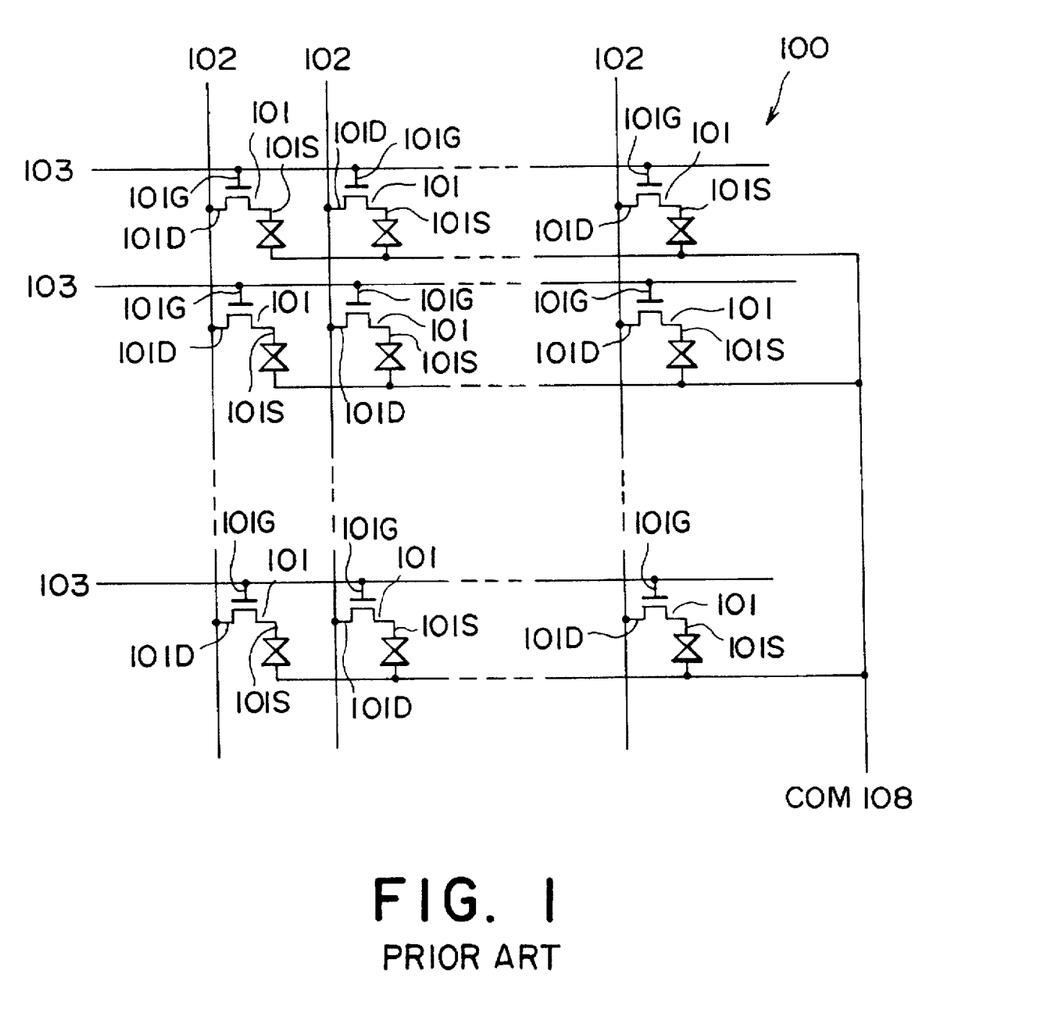
FIG. 1 shows an active matrix liquid crystal display panel comprising a conventional active matrix liquid crystal display device.
Figure 2A:
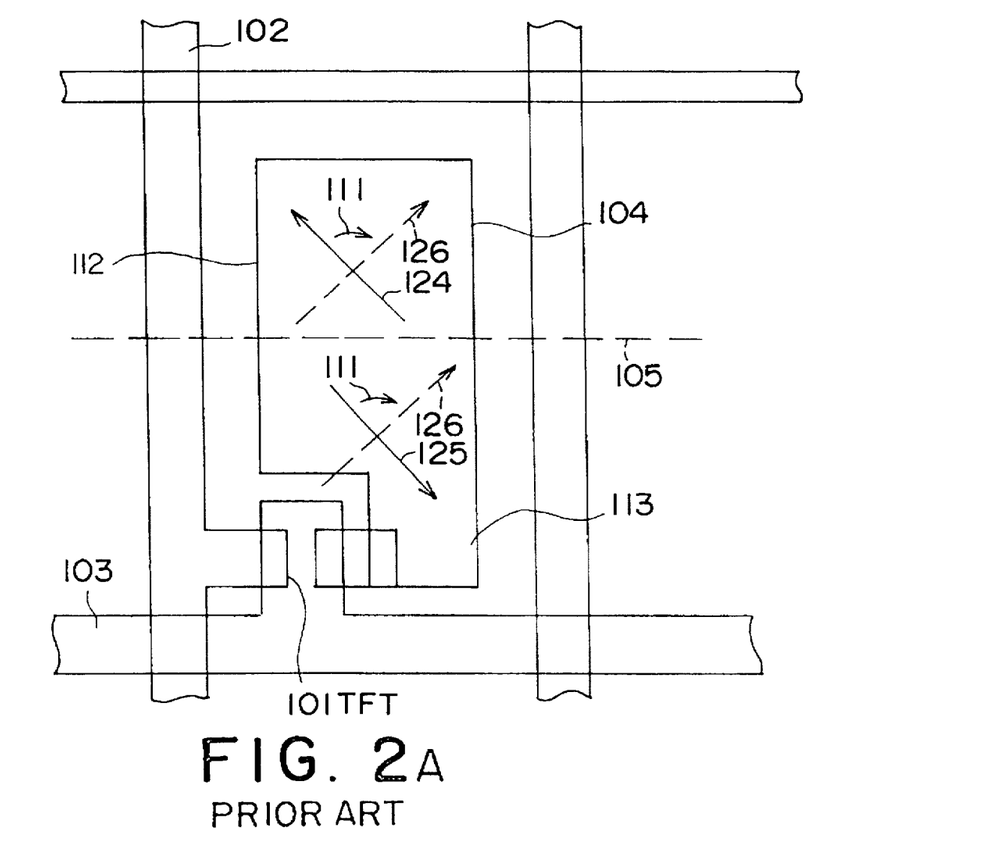
FIG. 2(A) is a plan view of the conventional active matrix liquid crystal display device illustrated in FIG. 1.
Figure 2B:
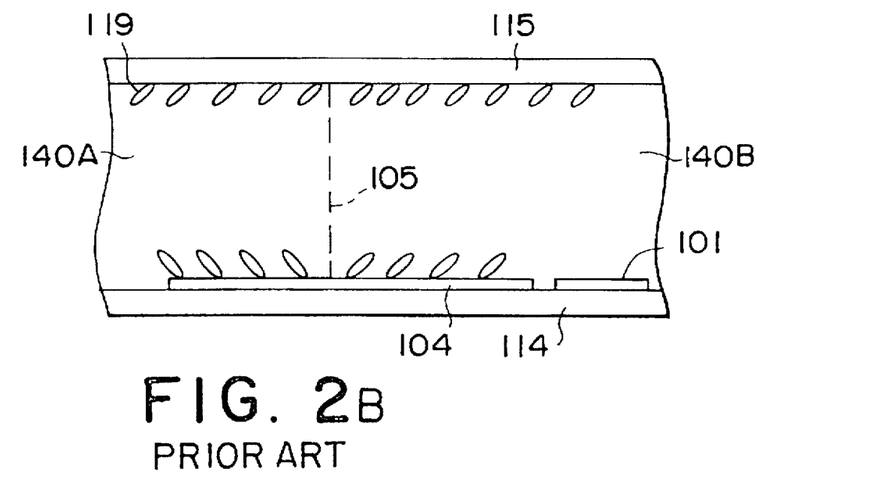
FIG. 2(B) is a sectional view of the conventional active matrix liquid crystal display device illustrated in FIG. 2(A)

Referring to FIGS. 1, 2(A) and 2(B), the conventional liquid crystal display device comprises a liquid crystal panel 100 including a matrix of thin-film transistors (TFT) 101. The matrix is arranged on a TFT substrate 114. Each of the thin-film transistors 101 has a gate electrode 101G, a source electrode 101S, and a drain electrode 101D. The gate electrodes 101G of the thin-film transistors 101 are formed on the TFT substrate 114. Gate lines or buses 103 are also formed on the TFT substrate 114 so as to be connected to the gate electrodes 101G. A gate insulating film (not shown) is formed on the gate electrodes 101G, the gate lines 103, and a remaining surface of the TFT substrate 114. Pixel electrodes 104 are formed on the gate insulating film (not shown) so as to be connected to the source electrodes 101S of the thin-film transistors 101, respectively. The pixel electrodes 104 are also connected to the ground. Each of the pixel electrodes 104 is made of a transparent conductive film of, for example, indium tin oxide and serves as a pixel or dot. Drain lines or buses 102 are formed on the gate insulating film (not shown) so as to be connected to the drain electrodes 101D of the thin-film transistors 101, respectively. Each of the drain lines 102 is made of a metal of, for example, aluminum or chrome. Besides, an opposite electrode COM108 is opposite to each of the pixel electrodes 104 through each of liquid crystal display cells 101C. In the liquid crystal display device, the thin-film transistors 101 selectively operate by supplying a drive signal to the desired drain lines 102. As a result, a predetermined voltage is applied to the pixel electrode 104 to display the pixel. In this event, the drain line 102 is supplied with an alternating or inverting voltage signal having a frequency which is equal to a scanning frequency of display.

As mentioned in the preamble of the instant specification, the contrast angular dependence problem is particularly serious in the conventional twisted nematic liquid crystal display devices. In order to solve this angular dependence problem, a liquid crystal display cell is divided into two domains, as illustrated in FIG. 2(A), one is a twisted nematic layer 112, and is a twisted nematic layer 113. It is accordingly achieved that viewing angle dependence is uniform between 90° and 180° directions. Herein, the twisted nematic layer 112 and the twisted nematic layer 113 are divided in line with a division line 105 of liquid crystal orientations. The twisted nematic layer 112 has a rubbing direction 124 indicated by solid-line arrow while the twisted nematic layer 113 has a rubbing direction 125 indicated also by solid-line arrow. Further, a color filter substrate 115 has a rubbing directions 126, 126 indicated by dashed-line arrows.

Referring to FIGS. 3(A) to 3(F), description is made about a method of manufacturing the conventional twisted nematic liquid crystal display device illustrated in FIG. 2(A).

Figure 3A:
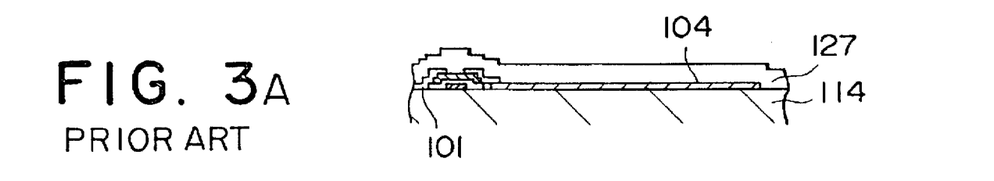
FIGS. 3(A) to 3(F) are views for describing a method of manufacturing the conventional active matrix liquid crystal display device illustrated in FIG. 2(A)

First, the TFT substrate 114 having a pixel electrode 104 is prepared in a known manner. An alignment film 127 is then coated on the TFT substrate 114, as shown in FIG. 3(A).

Figure 3B:
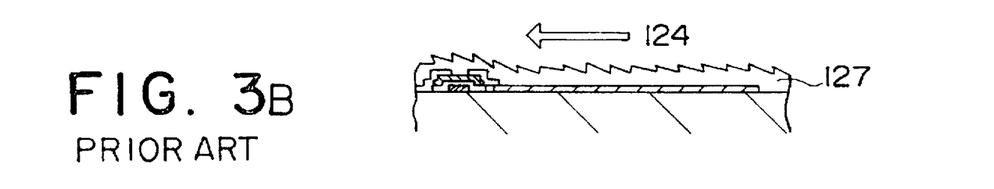

Second, the alignment film 127 is subjected to a primary rubbing operation or treatment in a rubbing direction 124 indicated by the arrow in FIG. 3(B).

Figure 3C:
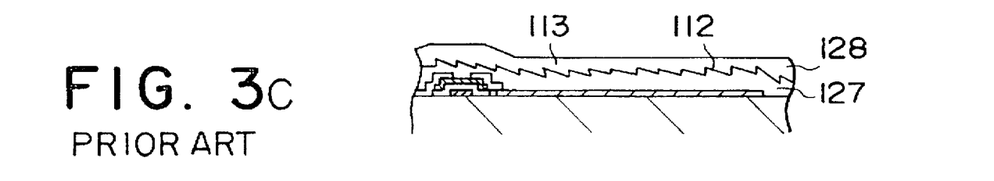
Figure 3D:
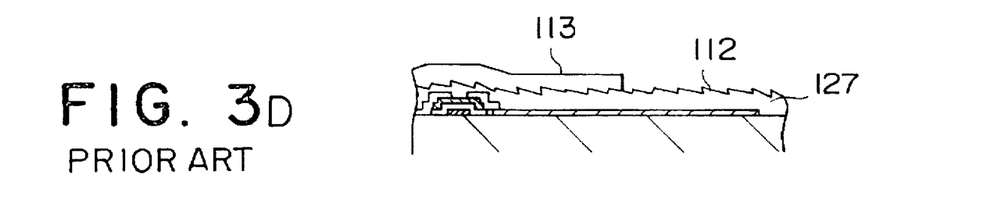

Third, resist 128 is coated on the rubbing-operated alignment film 127, as shown in FIG. 3(C). Exposure and development are carried out to shield a partial area of a surface of the alignment film 127 (that is an area of the twisted nematic layer 113 in the illustrated example) by the use of a portion of the resist 128, as shown in FIG. 3(D).

Figure 3E:
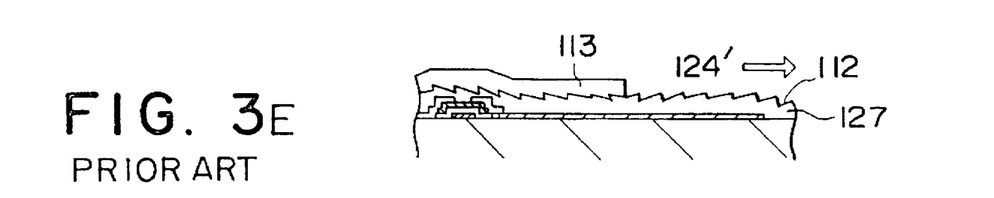

Fourth, the alignment film 127 is, as shown in FIG. 3(E), subjected to a secondary rubbing operation or treatment in a rubbing direction 124' which is indicated by the arrow in FIG. 3(E) and which is 180° different from the rubbing direction 124 in FIG. 3(B).

Figure 3F:
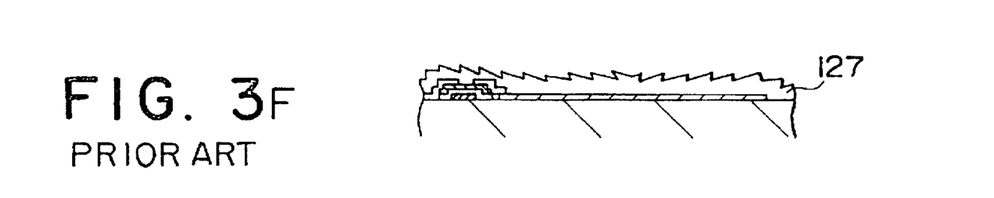

Fifth, the remaining resist 128 is removed from the rubbing-operated alignment film 127, as shown in FIG. 3(F).

Figure 4A:
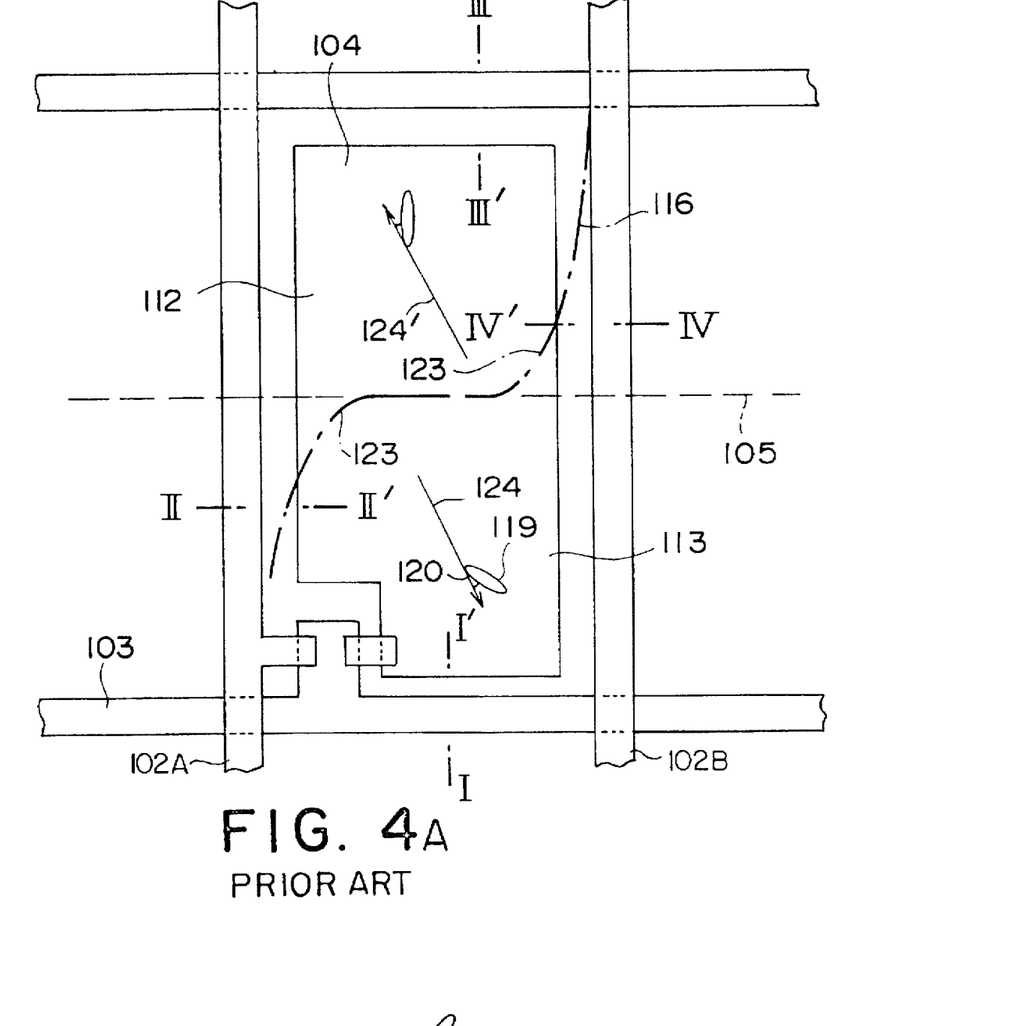
FIG. 4(A) is a view for explaining generations of disclinations in the conventional active matrix liquid crystal display device illustrated in FIG. 2(A)
Figure 4B:
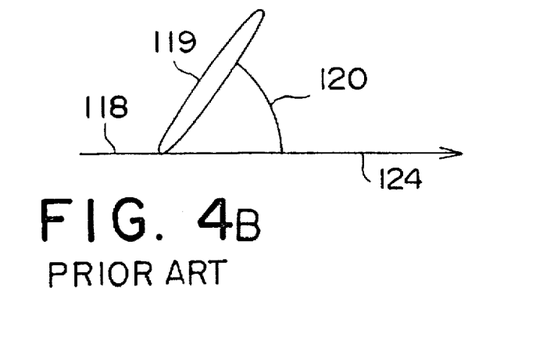
FIG. 4(B) is a view for explaining a pre-tilt angle or directions of a liquid crystal molecules in the conventional active matrix liquid crystal display device illustrated in FIG. 2(A)

Referring to FIGS. 4(A) and 4(B) with reference to FIGS. 2(A) and 2(B) continued, description is made about a problem of disclination caused in the conventional twisted nematic liquid crystal display device in which a liquid crystal display cell is divided into the two domains, as mentioned before. Hereinunder, the word, "disclination" means a region where liquid crystal orientations are discrete due to some reason.

When the twisted nematic liquid crystal display cell is supplied with voltage, a disclination is generated in line with the division line 105 of liquid crystal orientations. The reason is that liquid crystal molecules 119 on the pixel electrode 104 are aligned in the different directions from each other across the division line 105 of liquid crystal orientations, as depicted in FIG. 2(B). Accordingly, leakage of light is caused to occur due to the above-mentioned disclination, when the conventional twisted nematic liquid crystal display device is made in "normally white" mode. The leakage of light brings about a deterioration of display contrast. In the conventional twisted nematic liquid crystal display device, shading films are provided either on the TFT substrate 114 or on the color filter substrate 115 in alignment with the division lines 105 of liquid crystal orientations so as to prevent the deterioration of display contrast.

Referring to FIGS. 4(A), 4(B), 5(A) through 5(D), and 6, description is made about a problem of further disclination caused in the conventional twisted nematic liquid crystal display device in which a shading film is provided in alignment with the division line 105.

In the conventional twisted nematic liquid crystal display device, other disclinations are generated in alignment with the gate line 102a and 102b, as illustrated in FIG. 4(A). The other disclinations aligned with the gate line 102a and 102b get linked to the aforesaid disclination generated in line with the division line 105 to produce disclination curves 123, 123, as illustrated in FIG. 4(A).

Herein, a detailed description is made about reasons why the other disclinations aligned with the gate line 102a and 102b are generated, referring mainly to FIGS. 4(A), 4(B) and 5(A) to 5(D).

In FIG. 4(A), arrows 124 and 124' represent the rubbing directions mentioned with reference to FIGS. 3(B) and 3(E). The orientations of the liquid crystal molecules 119 on a surface 118 of the TFT substrate 114 are determined as depicted in FIGS. 4(A) and 4(B) with reference to the rubbing directions 124 and 124'. The liquid crystal molecules 119 are standing from the surface 118 at pretilt angles 120, as shown in FIGS. 4(A) and 4(B).

Figure 5A:
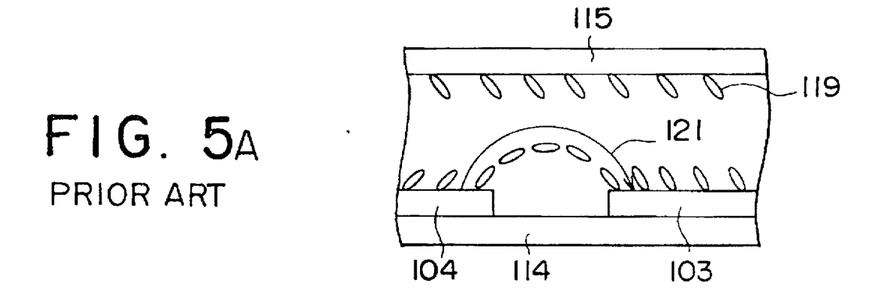
FIG. 5(A) is a vertical sectional view taken on line I-I' of FIG. 4(A)
Figure 5B:
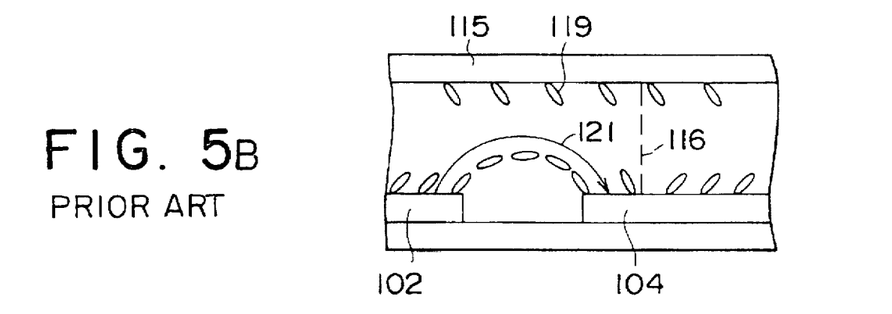
FIG. 5(B) is a vertical sectional view taken on line II-II' of FIG. 4(A)
Figure 5C:
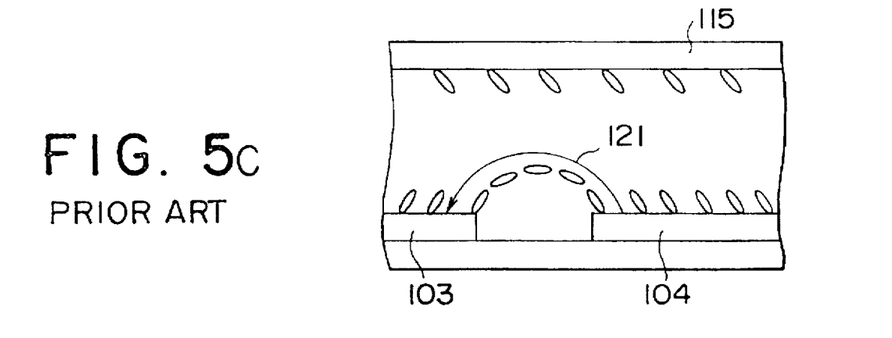
FIG. 5(C) is a vertical sectional view taken on line III-III' of FIG. 4(A)
Figure 5D:
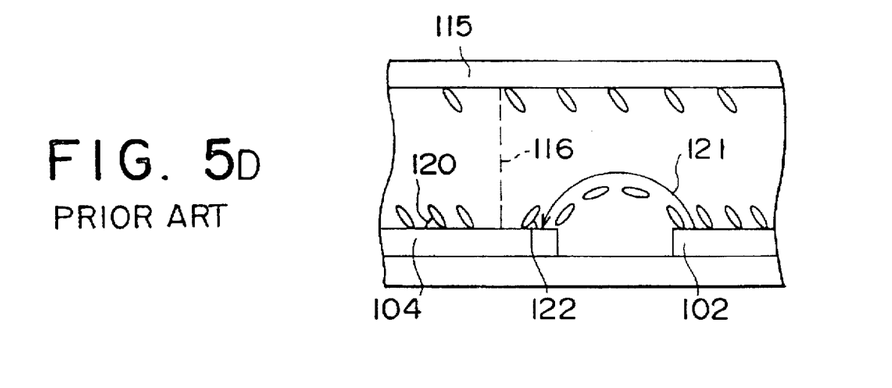
FIG. 5(D) is a vertical sectional view taken on line IV-IV' of FIG. 4(A)

Referring to FIGS. 5(B) and 5(D), description is made about action of the liquid crystal molecules 119.

It will be presumed without loss of generality that the liquid crystal molecules 119 on the TFT substrate 114 are inclined in the uniform directions in relation to the rubbing directions 124 and 124'. Inclination of the liquid crystal molecules 119 depends on the pretilt angle 120 determined by the rubbing operations. It will be assumed that transverse electric field 121 is generated from the drain lines 102 (which are directed perpendicular to a sheet of FIGS. 5(A) to 5(D)) towards the pixel electrode 104. Under the influence of the transverse electric field 121, the liquid crystal molecules 119 are oriented as shown in FIGS. 5(B) and 5(D). Accordingly, two kinds of liquid crystal molecules 119a and 119b come to exist on the pixel electrode 104. The liquid crystal molecules 119a are inclined in the direction of the pretilt angle 120 determined by the rubbing operations while the liquid crystal molecules 119b are inclined in the direction of the pretilt angle 122 determined by the transverse electric field 121. A boundary area between the region consisting of the liquid crystal molecules 119a and that consisting of the liquid crystal molecules 119b comes to be defined as another disclination, accordingly. Leakage of light is also caused to occur due to the other disclinations. The other disclinations are generated when viewed in both a cross section of II-II' and a cross section of IV-IV' of FIG. 4(A). In the conventional twisted nematic liquid crystal display device, additional shading films are provided on the color filter substrate 115 in alignment with the drain lines 102a, 102b, and the like to form a black matrix together with the above-described shading films aligned with the division lines 105. Besides, the other disclinations are not generated when viewed in both a cross section of I-I' and a cross section of III-III' of FIG. 4(A). This is because the pretilt angle determined by the transverse electric field 121 is not so different from the pretilt angle determined by the rubbing operations, as illustrated in FIGS. 5(A) and 5(C). Further reason is that the direction of the cross section lines I-I' and III-III' is substantially equal to the rubbing directions 124 and 124', as shown in FIG. 4(A).

However, it is difficult to shade the disclination curves 123, 123 illustrated in FIG. 4(A). If both the shading films aligned with the division lines 105 and the additional shading films aligned with the drain lines 102a, 102b and the like are fabricated to have an enough width to shade the disclination curves 123, 123, leakage of light therefrom can be prevented. However, if such shading films are fabricated so wide, a vignetting factor of the display panel is so deteriorated. Consequently, any other considerations have been made for the problem of the disclination curves 123, 123 in the conventional twisted nematic liquid crystal display device.

Figure 6:
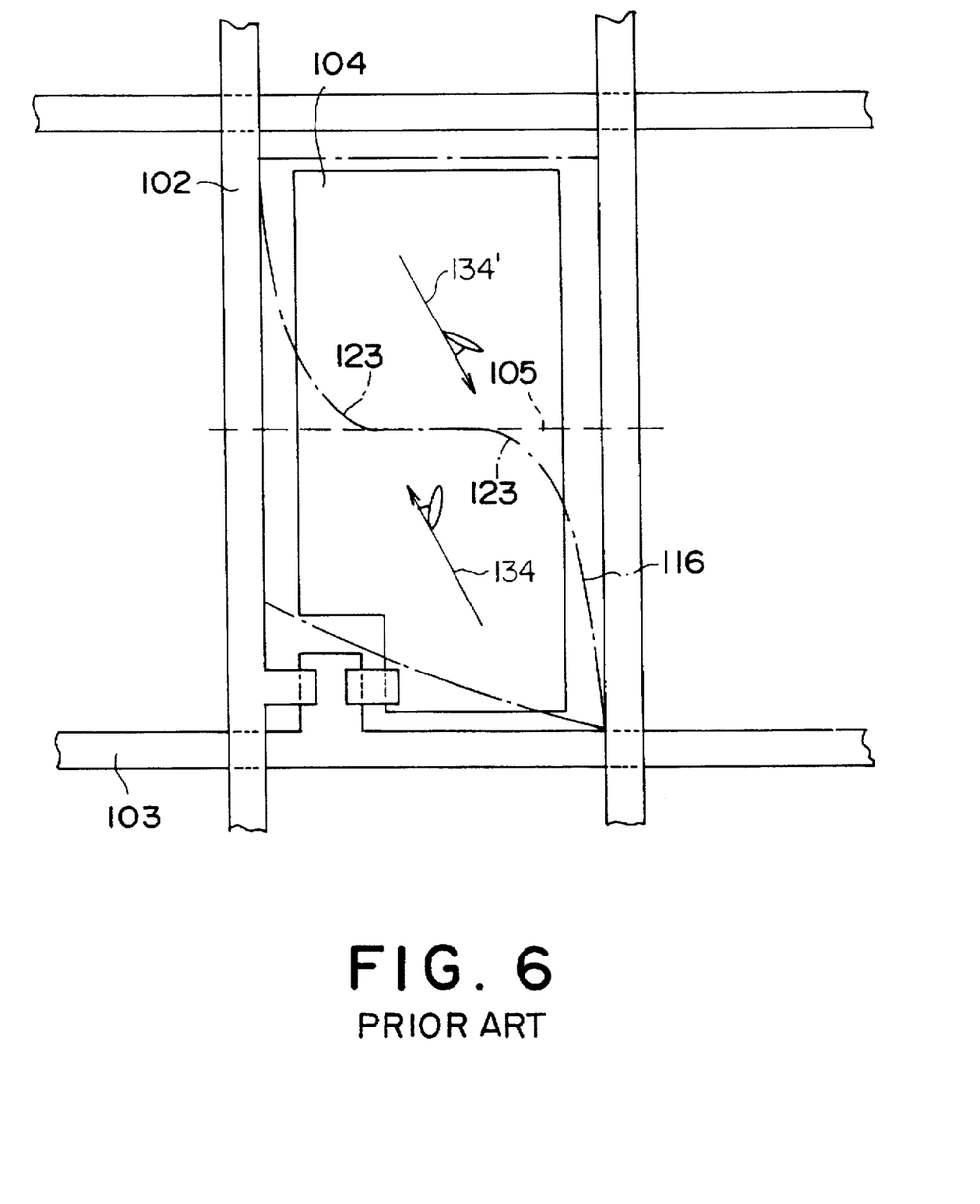
FIG. 6 is a view for explaining generations of disclinations in a conventional active matrix liquid crystal display device in which rubbing directions are opposite to those of FIG. 4(A)

Referring to FIG. 6, description is made about another case of the disclinations generated when the rubbing directions are different from those of FIG. 4(A).

In FIG. 6, the rubbing directions 134 and 134' are opposite to the rubbing directions 124 and 124' of FIG. 4(A), respectively. In this case, the disclination is generated in line with the alternate long and short dash line depicted in FIG. 6. Thus, the disclination curves 123, 123 are also generated in this case, as shown in FIG. 6. Accordingly, the problem of deterioration of the vignetting factor of the display panel is also caused to occur, if the shading films are fabricated so wide to cover the disclination curves 123, 123.

Figure 7:
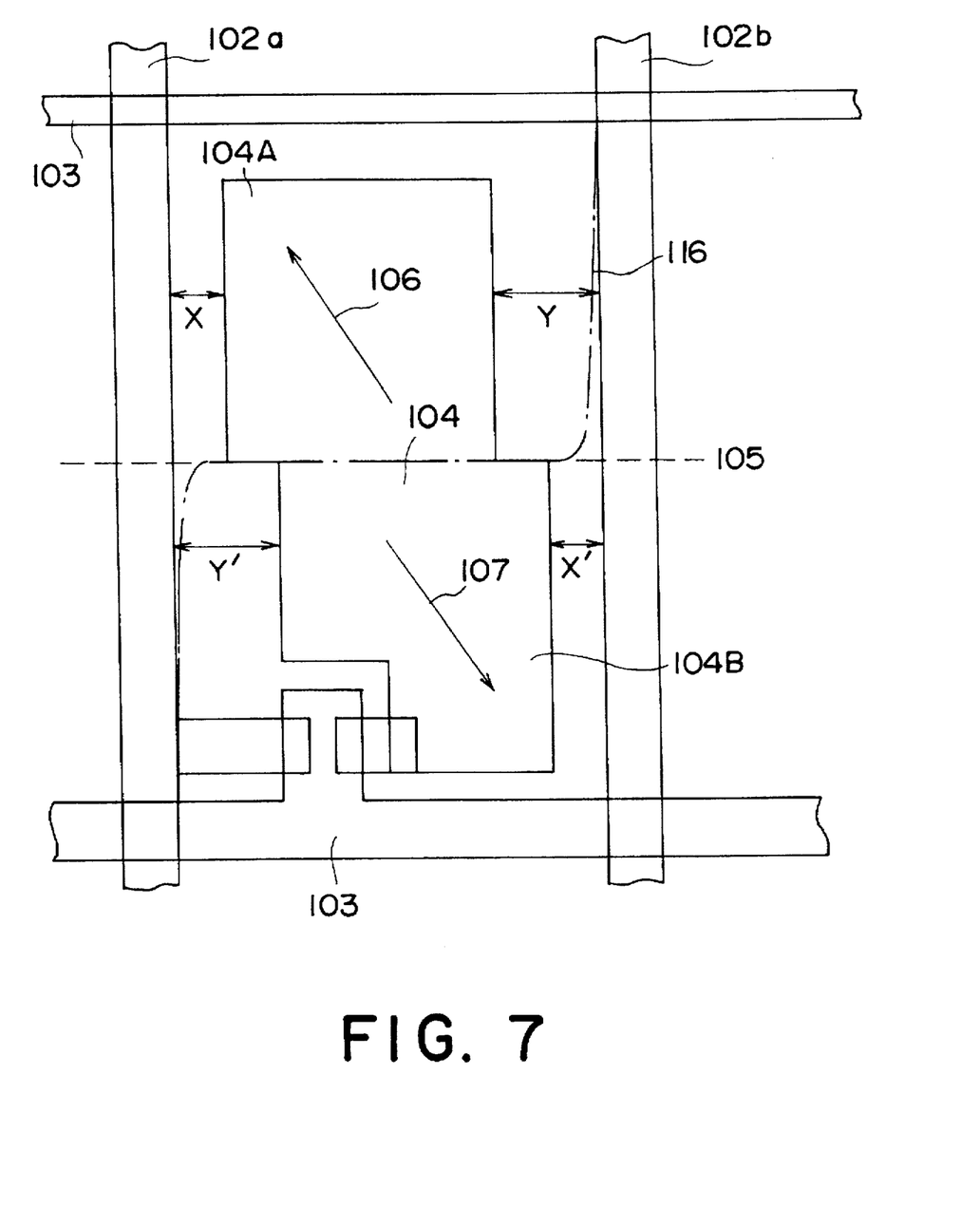
FIG. 7 is a plan view of an active matrix liquid crystal display device according to a first embodiment of this invention.

Now, referring to FIG. 7 with reference to FIG. 2(B), description will proceed to a liquid crystal display device according to a first embodiment of the present invention. The liquid crystal display device according to the first embodiment has some parts similar to those of the aforesaid conventional liquid crystal display device. The similar parts are designated by like reference numerals.

In FIGS. 7 and 2(B), the liquid crystal display device comprises first and second substrate members 114 and 115, a layer of a liquid crystal material 140 which is positioned between the first and the second substrate members 114 and 115 and which is divided into first and second layer domains 140A and 140B adjacent to each other. The first layer domain 140A has a first pre-tilt direction 106 of liquid crystal orientations while the second layer domain 140B has a second pre-tilt direction 107 of liquid crystal orientations. The first pre-tilt direction 106 is 180° different from the second pre-tilt direction 107.

The liquid crystal display device further comprises a thin-film transistor 101 which is formed on the first substrate member 114 and which has a drain electrode 101D, a gate electrode 101G and a source electrode 101S, a pixel electrode 104 which is electrically connected to the source electrode 101S and which has first and second portions 104A and 104B with the first and the second portions 104A and 104B being corresponding to the first and the second layer domains 140A and 140B, respectively, a primary drain line 102a electrically connected to the drain electrode 101D to supply the pixel electrode 104 with an image signal, a secondary drain line 102b adjacent to the primary drain line 102a with the pixel electrode 104 interposed therebetween, a gate line 103 which is electrically connected to the gate electrode 101G and which is perpendicular to the primary and the secondary drain lines 102a and 102b.

In the liquid crystal display device illustrated in FIG. 7, the first portion 104A of the pixel electrode 104 is nearer to the primary drain line 102a than to the secondary drain line 102b while the second portion 104B of the pixel electrode 104 is nearer to the secondary drain line 102b than to the primary drain line 102a. In other words, the first portion 104A of the pixel electrode 104 is remote from the primary drain line 102a by a first distance X while the first portion 104A of the pixel electrode 104 is remote from the secondary drain line 102b by a second distance Y larger than the first distance X. Further, the second portion 104B of the pixel electrode 104 is remote from the secondary drain line 102b by a primary distance X' while the second portion 104B of the pixel electrode 104 is remote from the primary drain line 102a by a secondary distance Y' larger than the primary distance X'. In this embodiment, the first distance X is 6 microns while the second distance Y is 8 microns. Moreover, the primary distance X' is 6 microns while the secondary distance Y' is 8 microns.

Besides, a shading film having a small width is formed on the TFT substrate 114 in alignment with the division line 105 of the liquid crystal orientations.

According to this embodiment, the second distance Y corresponding to a region of another disclination aligned with the drain line 102b is larger than the first distance X and the secondary distance Y' corresponding to a region of the another disclination aligned with the drain line 102a is larger than the primary distance X'. As a result, the transverse electric fields 121 mentioned with reference to FIGS. 5(B) and 5(D) are weakened, so that the above-described disclination curves 123, 123 are far reduced in size, as shown in FIG. 7. Accordingly, it can be prevented that changes of the disclination curves 123, 123 bring about an afterimage in eyesight, even if the electric field is varied between the drain lines 102a, 102b and the pixel electrode 104. Besides, leakage of light from the disclination in line with the division line 105 can be shaded by the above-mentioned shading film having the small width. Consequently, an excellent contrast of display, which is not smaller than 150, can be achieved by the use of the liquid crystal display device illustrated in FIG. 7. Further, an improved eyesight characteristic is obtained not only in up and down directions but also in leftside and rightside directions. Moreover, afterimages are completely prevented in the liquid crystal display panel using the liquid crystal display device illustrated in FIG. 7. These meritorious effects can be obtained without the above-mentioned deterioration of the vignetting factor of the display panel.

Figure 8:
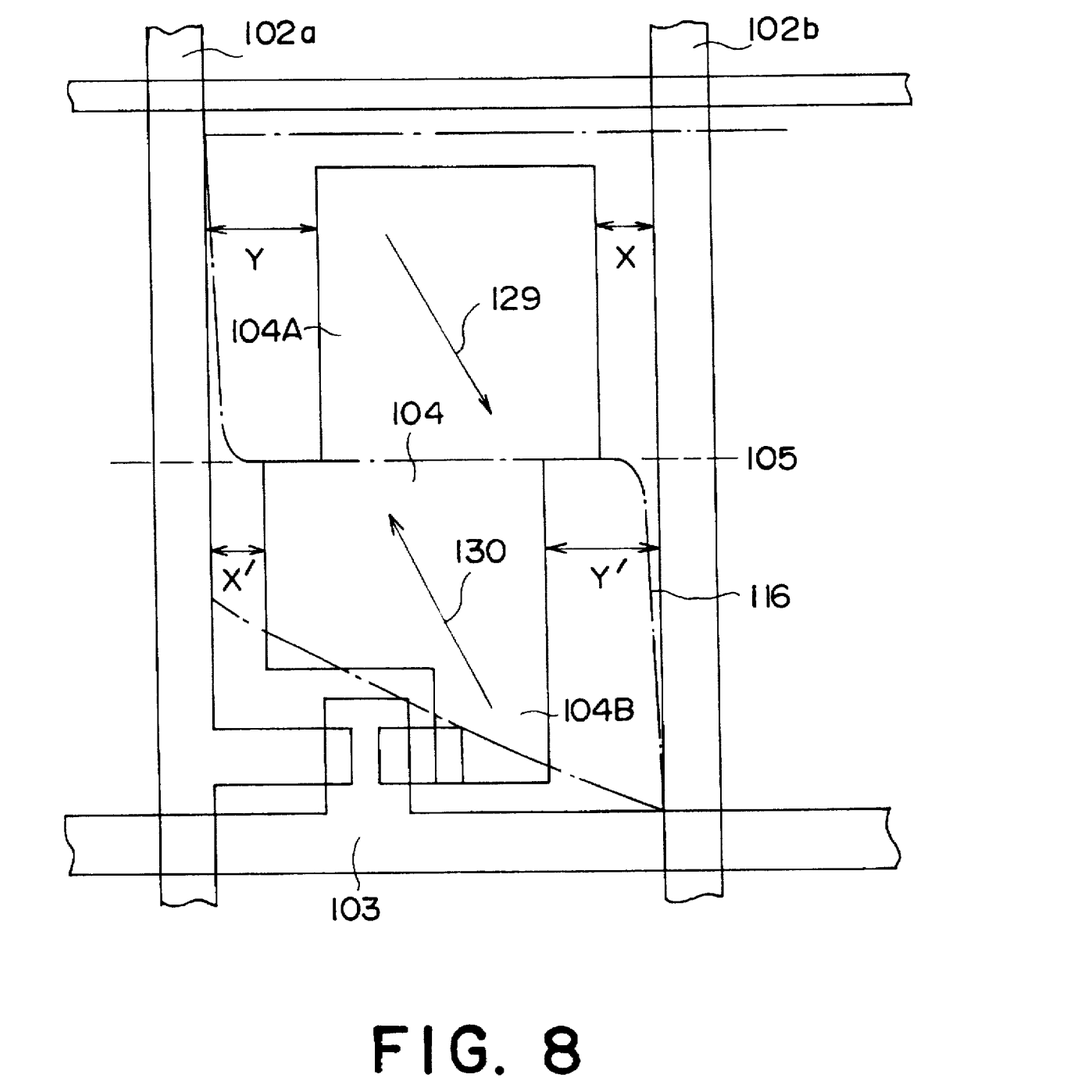
FIG. 8 is a plan view of an active matrix liquid crystal display device according to a second embodiment of this invention.

Referring to FIG. 8 with reference to FIG. 6, description proceeds to a liquid crystal display device according to a second embodiment of the present invention. The liquid crystal display device according to the second embodiment has some parts similar to those of the first embodiment. The similar parts are designated by like reference numerals. The structure of this embodiment is arranged for reducing the disclination curves 123, 123 in FIG. 6.

In this embodiment, the rubbing directions 129 and 130 are different from those of the first embodiment. Namely, in FIG. 8, the rubbing directions 129 and 130 are opposite to the rubbing directions 106 and 107 of FIG. 7, respectively.

In the liquid crystal display device illustrated in FIG. 8, the first portion 104A of the pixel electrode 104 is nearer to the secondary drain line 102b than to the primary drain line 102a while the second portion 104B of the pixel electrode 104 is nearer to the primary drain line 102a than to the secondary drain line 102b. In other words, the first portion 104A of the pixel electrode 104 is remote from the secondary drain line 102b by a first distance X while the first portion 104A of the pixel electrode 104 is remote from the primary drain line 102a by a second distance Y larger than the first distance X. Further, the second portion 104B of the pixel electrode 104 is remote from the primary drain line 102a by a primary distance X' while the second portion 104B of the pixel electrode 104 is remote from the secondary drain line 102b by a secondary distance Y' larger than the primary distance X'. In this embodiment, the first distance X is 6 microns while the second distance Y is 8 microns. Moreover, the primary distance X' is 6 microns while the secondary distance Y' is 8 microns.

Besides, similarly to the first embodiment, a shading film having a small width is formed on the TFT substrate 114 in alignment with the division line 105 of the liquid crystal orientations.

According to this embodiment, the second distance Y corresponding to a region of another disclination aligned with the drain line 102a is larger than the first distance X and the secondary distance Y' corresponding to a region of another disclination aligned with the drain line 102b is larger than the primary distance X'. As a result, the transverse electric fields mentioned only in conjunction with the first embodiment are weakened also in this embodiment, so that the above-described disclination curves 123, 123 are far reduced in size, as shown in FIG. 8.

While this invention has thus far been described in specific conjunction with a few preferred embodiments thereof, it will now be readily possible for one skilled in the art to carry this invention into effect in various other manners. For example, in the above first and second embodiments, the distances X and X' are 6 microns while the distances Y and Y' are 8 microns. However, the distances X, X' and Y, Y' are not restricted to 6 and 8 microns, respectively. Each distance may be varied under the condition of X<Y and X'<Y'. Further, a thin-film diode may be employed as the active switching element, although the thin-film transistor 101 is used in the above first and second embodiments. Moreover, the layer of the liquid crystal material 140 is divided into first and second layer domains 140A, 140B while the pixel electrode 104 is divided into first and second portions 104A, 104B. However, the layer of the liquid crystal material and the pixel electrode may be divided into more than two domains or portions.

What is claimed is:

1. A liquid crystal display device for use in an active matrix liquid crystal display panel, comprising:
   first and second substrate members;
   a layer of a liquid crystal material which is positioned between said first and said second substrate members;
   an active switching element formed on said first substrate member;
   a pixel electrode which is electrically connected to said active switching element, and which has first and second portions connected to each other;
   a primary signal line electrically connected to said pixel electrode to supply said pixel electrode with a driving signal;
   a secondary signal line adjacent to said primary signal line with said pixel electrode interposed therebetween;
   a scanning line which is electrically connected to said pixel electrode and which is perpendicular to said primary and said secondary signal lines; and
   said first portion of said pixel electrode being nearer to said primary signal line than to said secondary signal line while said second portion of said pixel electrode being nearer to said secondary signal line than to said primary signal line.

2. A liquid crystal display device for use in an active matrix liquid crystal display panel, comprising:
   first and second substrate members;
   a layer of a liquid crystal material which is positioned between said first and said second substrate members;
   a thin-film transistor which is formed on said first substrate member and which has a drain electrode, a gate electrode and a source electrode;
   a pixel electrode which is electrically connected to said source electrode and which has first and second portions connected to each other;

a primary drain line electrically connected to said drain electrode to supply said pixel electrode with a driving signal;

a secondary drain line adjacent to said primary drain line with said pixel electrode interposed therebetween;

a gate line which is electrically connected to said gate electrode and which is perpendicular to said primary and said secondary drain lines; and said first portion of said pixel electrode being nearer to said primary drain line than to said secondary drain line while said second portion of said pixel electrode being nearer to said secondary drain line than to said primary drain line.

3. A liquid crystal display device, comprising:

first and second substrate members;

a layer of a liquid crystal material which is positioned between said first and said second substrate members and which is divided into first and second layer domains adjacent to each other;

said first layer domain having a first tilt direction for a first liquid crystal orientation, said second layer domain having a second tilt direction for a second liquid crystal orientation, said first tilt direction being different from said second tilt direction;

a thin-film transistor which is formed on one of said first and second substrate members and which has a drain electrode, a gate electrode and a source electrode;

a pixel electrode which is electrically connected to said source electrode, and which has first and second portions connected to each other, with said first and said second portions corresponding to said first and said second layer domains, respectively;

a primary drain line electrically connected to said drain electrode to supply said pixel electrode with a driving signal;

a secondary drain line adjacent to said primary drain line with said pixel electrode interposed therebetween;

a gate line which is electrically connected to said gate electrode and which is perpendicular to said primary and secondary drain lines; and said first portion of said pixel electrode being nearer to said primary drain line than to said secondary drain line and said second portion of said pixel electrode being nearer to said secondary drain line than to said primary drain line.

4. A liquid crystal display device as claimed in claim 3, wherein said first substrate member comprises a thin-film transistor substrate and an alignment film, said alignment film have been subjected to a rubbing operation so as to divide said layer of said liquid crystal material into said first and said second layer domains.

5. A liquid crystal display device as claimed in claim 4, wherein said liquid crystal material is a twisted nematic liquid crystal material.

6. A liquid crystal display device, comprising:

first and second substrate members;

a layer of a liquid crystal material which is positioned between said first and said second substrate members and which is divided into first and second layer domains adjacent to each other;

said first layer domain having a first pre-tilt direction for a first liquid crystal orientation, said second layer domain having a second pre-tilt direction for a second liquid crystal orientation, said first pre-tilt direction being different from said second pre-tilt direction;

a thin-film transistor which is formed on said first substrate member and which has a drain electrode, a gate electrode and a source electrode;

a pixel electrode which is electrically connected to said source electrode, and which has first and second portions connected to each other with said first and said second portions corresponding to said first and said second layer domains, respectively;

a primary drain line electrically connected to said drain electrode to supply said pixel electrode with an image signal;

a secondary drain line adjacent to said primary drain line with said pixel electrode interposed therebetween;

a gate line which is electrically connected to said gate electrode and which is perpendicular to said primary and secondary drain lines; and said first portion of said pixel electrode being nearer to said primary drain line than to said secondary drain line and said second portion of said pixel electrode being nearer to said secondary drain line than to said primary drain line.

7. A liquid crystal display device as claimed in claim 6, wherein said first pre-tilt direction has a difference of 180° from said second pre-tilt direction.

8. A liquid crystal display device as claimed in claim 7, said first substrate member including a thin-film transistor substrate and an alignment film, wherein said alignment film has been subjected to a rubbing operation which produces said difference of 180°.

9. A liquid crystal display device, comprising:

first and second substrate members;

a layer of a liquid crystal material which is positioned between said first and said second substrate members and which is divided into first and second layer domains adjacent to each other;

said first layer domain having a first pre-tilt direction for a first liquid crystal orientation, said second layer domain having a second pre-tilt direction for a second liquid crystal orientation, said first pre-tilt direction being different from said second pre-tilt direction;

a thin-film transistor which is formed on said first substrate member and which has a drain electrode, a gate electrode and a source electrode;

a pixel electrode which is electrically connected to said source electrode, and which has first and second portions connected to each other with said first and said second portions corresponding to said first and said second layer domains, respectively;

a primary drain line electrically connected to said drain electrode to supply said pixel electrode with an image signal;

a secondary drain line adjacent to said primary drain line with said pixel electrode interposed therebetween;

a gate line which is electrically connected to said gate electrode and which is perpendicular to said primary and secondary drain lines;

said first portion of said pixel electrode being remote from said primary drain line by a first distance while being remote from said secondary drain line by a second distance larger than said first distance; and said second portion of said pixel electrode being remote from said secondary drain line by a primary distance while being remote from said primary drain line by a secondary distance larger than said first distance.

10. A liquid crystal display device comprising:

first and second substrate members;

a layer of a liquid crystal material which is positioned between said first and second substrate members and which is divided into first and second layer domains adjacent to each other;

said first layer domain having a first pre-tilt direction for a first liquid crystal orientation, said second layer domain having a second pre-tilt direction for a second liquid crystal orientation, said first pre-tilt direction being different from said second pre-tilt direction;

a thin film transistor which is formed on said first substrate member, and which has a drain electrode, a gate electrode and a source electrode;

a pixel electrode which is electrically connected to said source electrode and which has first and second portions with said first and said second portions corresponding to said first and said second layer domains, respectively;

a primary drain line electrically connected to said drain electrode to supply said pixel electrode with an image signal;

a secondary drain line adjacent to said primary drain line with said pixel electrode interposed therebetween;

a gate line which is electrically connected to said gate electrode and which is perpendicular to said primary and secondary drain lines;

said first portion of said pixel electrode being remote from said primary drain line by a first distance while being remote from said secondary drain line by a second distance larger than said first distance; and said second portion of said pixel electrode being remote from said secondary drain line by a primary distance while being remote from said primary drain line by a secondary distance larger than said first distance, wherein said first distance is 6 microns while said second distance is 8 microns.

11. A liquid crystal display device comprising:

first and second substrate members;

a layer of a liquid crystal material which is positioned between said first and second substrate members and which is divided into first and second layer domains adjacent to each other;

said first layer domain having a first pre-tilt direction for a first liquid crystal orientation, said second layer domain having a second pre-tilt direction for a second liquid crystal orientation, said first pre-tilt direction being different from said second pre-tilt direction;

a thin film transistor which is formed on said first substrate member, and which has a drain electrode, a gate electrode and a source electrode;

a pixel electrode which is electrically connected to said source electrode and which has first and second portions with said first and said second portions corresponding to said first and said second layer domains, respectively;

a primary drain line electrically connected to said drain electrode to supply said pixel electrode with an image signal;

a secondary drain line adjacent to said primary drain line with said pixel electrode interposed therebetween;

a gate line which is electrically connected to said gate electrode and which is perpendicular to said primary and secondary drain lines;

said first portion of said pixel electrode being remote from said primary drain line by a first distance while being remote from said secondary drain line by a second distance larger than said first distance; and said second portion of said pixel electrode being remote from said secondary drain line by a primary distance while being remote from said primary drain line by a secondary distance larger than said first distance, wherein said primary distance is 6 microns while said secondary distance is 8 microns.

12. A liquid crystal display device, comprising:

a liquid crystal material; and liquid crystal display circuitry, including a primary drain line, a secondary drain line, and a liquid crystal electrode, which is connected to said liquid crystal material, and comprises a first portion and a second portion such that said first portion of said liquid crystal electrode is nearer to said primary drain line than to said secondary drain line and said second portion of said liquid crystal electrode is nearer to said secondary drain line than to said primary drain line, and wherein said first portion of said liquid crystal electrode is connected to said second portion of said liquid crystal electrode.

* * * * *